Patented Oct. 19, 1954

2,692,275

UNITED STATES PATENT OFFICE 2,692,275

PREPARATION OF 1,8-DIISOCYANATO-p-MENTHANE

Newman M. Bortnick, Oreland, Pa., assignor to Rohm & Haas Company, Philadelphia, Pa., a corporation of Delaware No Drawing. Application January 23, 1953,
Serial No. 332,996

4 Claims. (Cl. 260—453)

This invention relates to the preparation of 1,8-diisocyanato-p-menthane having the formula

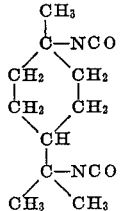

The object of this invention is to produce the diisocyanate cheaply and efficiently; and this is realized by the process of this invention which comprises pyrolyzing a carbamate, which is described below, in the presence of a basic catalyst such as the water-soluble metal hydroxides or alkoxides or the water-insoluble metallic oxides or hydroxides. The pyrolysis can be carried out in several ways, such as by passing the vapors of the carbamate through a tube containing the basic compound. In the preferred embodiment of this process, however, a carbamate is heated at its boiling point in the presence of the basic compound and is decomposed into the diisocyanate which is removed and recovered by distillation. Following is a representation of the course of the reaction:

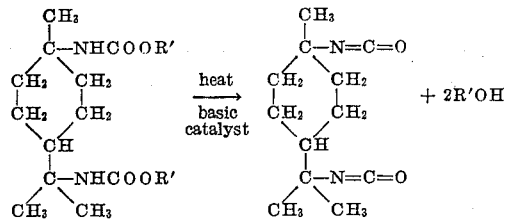

in which R' is a hydrocarbon group, preferably a lower alkyl group such as a methyl, ethyl, or isopropyl group.

The dicarbamates, from which the diisocyanate of this invention is made, are themselves prepared from 1,8-diamino-p-menthane. The latter compound is well known and is converted to the carbamates by the conventional reaction with an ester of chloroformic acid.

It has been proposed heretofore, for example, in United States Patent 2,409,712, to convert carbamates which have a primary alkyl group such as a n-butyl or a n-dodecyl group attached to the nitrogen atom into the corresponding isocyanates by a simple process of heating. Such a method is, however, inadequate for the production of 1,8-diisocyanato-p-menthane because the carbamate shown above is surprisingly stable towards heat alone and can actually be distilled without decomposition. It is only when a basic compound is present that the reaction shown above takes place.

The group which is represented by R' in the above general formula can be virtually any kind of a hydrocarbon group which is free of non-benzenoid unsaturation, such as an aliphatic group typified by methyl or ethyl groups, an alicyclic group exemplified by the cyclohexyl radical, or an aromatic group such as the benzyl radical. Since, however, this group ultimately forms the alcohol R'OH, it is much preferred that it be a simple lower alkyl group such as a methyl, ethyl, propyl or butyl group so that the alcohol R'OH which is formed together with the diisocyanate can be easily separated from the latter by distillation.

The compound which is employed to accelerate the pyrolysis must contain a metal and must be basic. It can be a water-soluble or a water-insoluble, basic metallic compound. If it is of the water-soluble type, it must be at least as basic as sodium acetate. This is to say, it must be so basic that its 0.1 N aqueous solution has a pH of at least 8, and preferably from 10 to 13, at 25° C. Included in this category are the oxides, hydroxides and alkoxides of the alkali metals, sodium hydroxide, sodium methoxide, lithium oxide, potassium ethoxide, and the like, as well as the salts of the alkali metals and weak acids, especially the salts of aliphatic carboxylic acids, exemplified by sodium acetate, potassium carbonate and lithium bicarbonate. Alkali metals, e. g., sodium and potassium, can also be used, especially since they react with the alcohols formed in the process to yield alkoxides, already noted as being among the best catalysts for use in this process. Oxides and hydroxides of the alkaline earth metals are likewise operable as typified by lime, zinc oxide, magnesium oxide, barium hydroxide, strontium hydroxide, et cetera. Other basic metallic compounds which have been used successfully include the oxides and hydroxides of cadmium, lead, mercury, manganese, iron, nickel, cobalt, cerium, copper and tin. What is required is that the catalyst be basic in the accepted sense that it forms hydroxyl ions in water or is capable of neutralizing a strong mineral acid such as hydrochloric acid or sulfuric acid.

It is recommended that from about 2% to 15% of the basic compound, based on the weight of the carbamate, be used at the outset. These amounts, however, are not critical as is evident from the fact that the ratio of basic compound to carbamate increases of necessity as the isocyanate is removed from the reactor during the progress of the reaction.

In the preferred embodiment of this invention, the carbamate and the basic catalyst are heated together to boiling and the products, the 1,8-diisocyanato-p-menthane and an alcohol, are distilled from the reaction mixture. It is also recommended that the pyrolysis be carried out under reduced pressure.

The following example, in which all parts are by weight, serves to illustrate the nature of this process.

Example

A mixture of 1000 parts of the compound

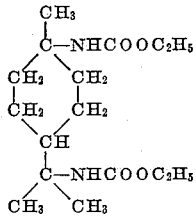

and 50 parts of lime was charged to a flask equipped with a thermometer, stirrer and adapter set up for distillation under reduced pressure. Ethanol was first collected in the receiver when the pot temperature reached 140° C./4 mm. After about 55 minutes the product began to distil at 185° C./43 mm. When the temperature reached 188° C., the receiver was changed and during the following 135 minutes practically all of the material was distilled at 190° C./36 mm Petroleum ether was added to the 728 parts of distillate and the resultant solution was extracted four times with its own volume of water. The petroleum ether solution was evaporated to remove the solvent and a residue of 583 parts was obtained. The latter was carefully fractionated and the fraction boiling at 93–6° C./0.5 mm. was isolated and identified by analysis as 1,8-diisocyanato-p-menthane. The overall yield of this product was slightly over 70%.

Essentially the same results (yields of 60%–80%) were obtained when the other basic compounds described above were substituted for the lime; but none of the desired diisocyanato compound was obtained in the absence of a basic catalyst.

As is known, isocyanates including the diisocyanate which is prepared by the process of this invention are valuable chemicals which are very reactive with primary and secondary amines, carboxylic acids and alcohols. They are also useful as components of adhesives wherein they promote adhesion and as modifiers for plastics, especially those of the nylon type.

This process is not only efficient for the preparation of 1,8-diisocyanato-p-menthane but is used to advantage in the preparation of mono-isocyanates containing a tertiary-alkyl group, as disclosed in another of my applications for Letters Patent, Serial No. 311,537, filed September 25, 1952.

I claim:
1. A process for the preparation of 1,8-diisocyanato-p-menthane of the formula

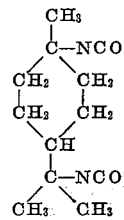

which comprises pyrolyzing a carbamate of the formula

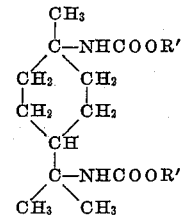

in which R′ represents a monovalent hydrocarbon group free of non-benzenoid unsaturation, in the presence of a basic catalyst which is a member of the class consisting of (a) water-soluble metallic compounds of such basic strength that their 0.1 N aqueous solutions have a pH of at least 8 at 25° C. and (b) water-insoluble metallic oxides and hydroxides, and isolating said 1,8-diisocyanato-p-menthane by distillation from the mixture of said carbamate and said basic compound.

2. A process for the preparation of 1,8-diisocyanato-p-menthane of the formula

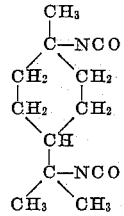

which comprises pyrolyzing a carbamate of the formula

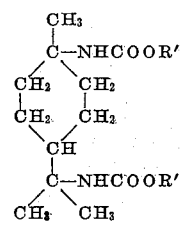

in which R′ represents an alkyl group, in the presence of a basic catalyst which is a member of the class consisting of (a) water-soluble metallic compounds of such basic strength that their 0.1 N aqueous solutions have a pH of at least 8 at 25° C. and (b) water-insoluble metallic oxides and hydroxides, and isolating said 1,8-diisocyanato-p-menthane by distillation from the mixture of said carbamate and said basic compound.

3. A process for the preparation of 1,8-diisocyanato-p-menthane of the formula

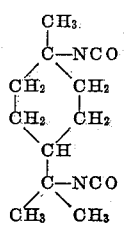

which comprises pyrolyzing a carbamate of the formula

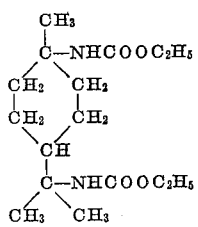

in the presence of a basic catalyst which is a member of the class consisting of (a) water-soluble metallic compounds of such basic strength that their 0.1 N aqueous solutions have a pH of at least 8 at 25° C. and (b) water-insoluble metallic oxides and hydroxides, and isolating said 1,8-diisocyanato-p-menthane by distillation from the mixture of said carbamate and said basic compound.

4. A process for the preparation of 1,8-diisocyanato-p-menthane of the formula

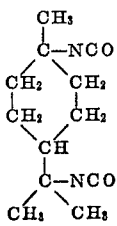

which comprises pyrolyzing a carbamate of the formula

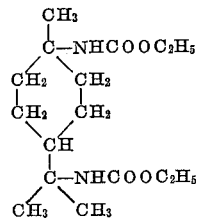

in the presence of lime, and isolating said 1,8-diisocyanato-p-menthane by distillation from the mixture of said carbamate and said lime.

References Cited in the file of this patent
UNITED STATES PATENTS

| Number | Name | Date |
| --- | --- | --- |
| 2,409,712 | Schweitzer | Oct. 22, 1946 |